Patented Sept. 1, 1942

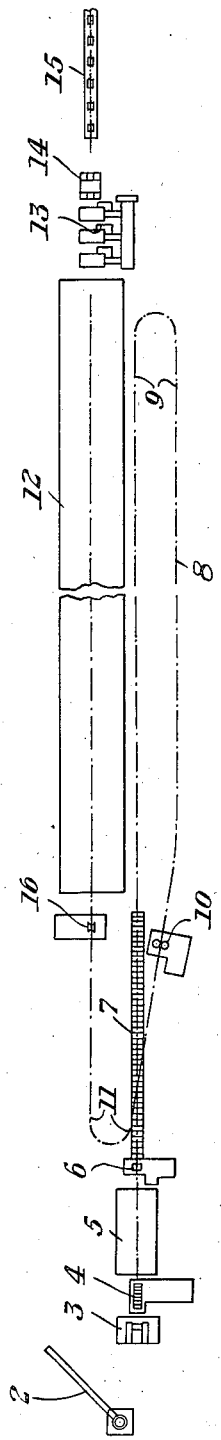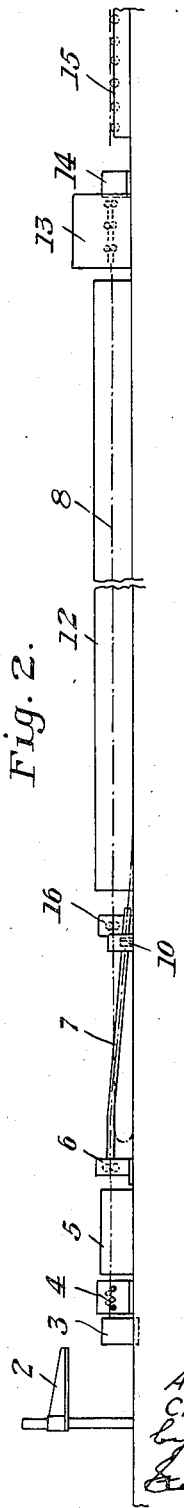

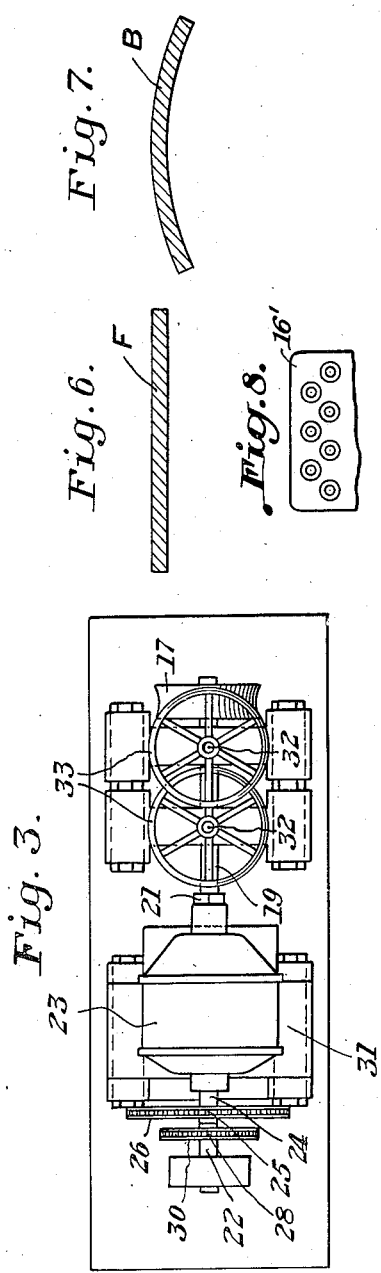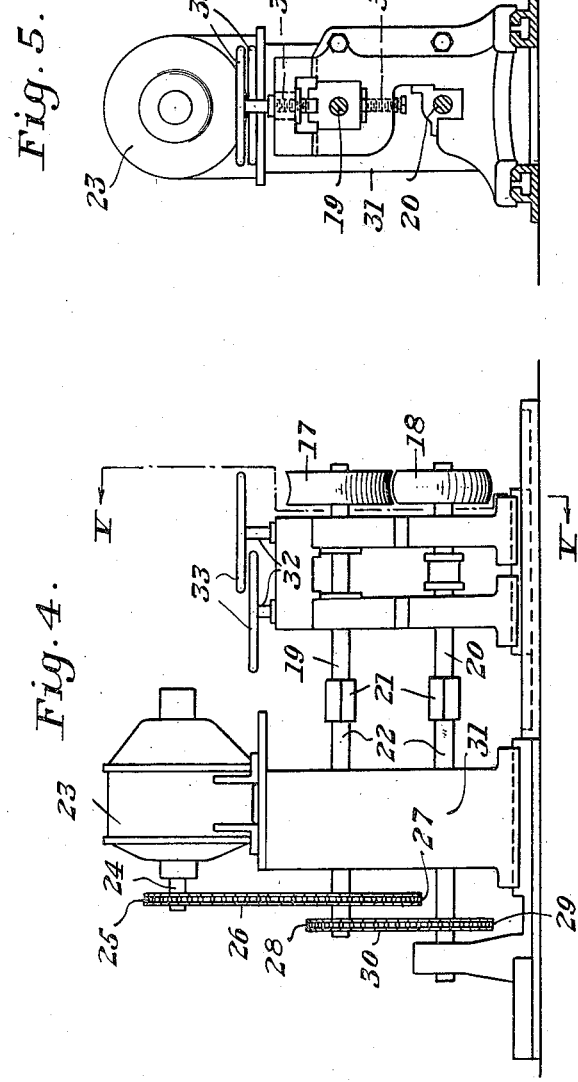

2,294,611

UNITED STATES PATENT OFFICE 2,294,611

HANDLING AND TREATMENT OF SKELP OR THE LIKE

August J. Wagner, Wheeling, W. Va., and Clarence H. Verwohlt, St. Clairsville, Ohio, assignors to Wheeling Steel Corporation, Wheeling, W. Va., a corporation of Delaware Application October 4, 1940, Serial No. 359,650

8 Claims. (Cl. 263—3)

This invention relates broadly to handling and treatment of skelp or the like and more particularly to threading skelp or the like into elongated furnaces. The invention further relates to a new and improved method of operating on skelp or the like and of continuously making pipe and also novel apparatus for such purposes.

The invention is particularly applicable to handling or operating upon skelp being threaded into an elongated furnace and the invention has been used with great success commercially in the threading of an elongated heating furnace of a continuous pipe mill. For purposes of explanation and illustration the invention will be described as applied to the threading of an elongated heating furnace of a continuous butt weld pipe mill.

In a continuous butt weld pipe mill successive skelps which are welded end to end to form in effect one long skelp of indefinite length are passed continuously through an elongated heating furnace and then through a welder. In the heating furnace the temperature of at least the edges of the skelp is raised to or near the welding temperature. In the welder the heated skelp is bent into cylindrical form and its edges are welded together. An example of a mill of the type mentioned is a Fretz-Moon continuous butt weld pipe mill. The edges of the skelp may be raised to welding temperature in the furnace or they may be raised in the furnace to a temperature somewhat below welding temperature and subsequently they may be subjected to blasts of air to further raise their temperature.

Modern continuous pipe welders operate at comparatively high speed. The skelp being formed into pipe may pass through the welder at speeds as high as 300 to 400 feet per minute. In order to properly heat the rapidly moving skelp before it enters the welder a very long heating furnace is necessary. For example, heating furnaces between 150 and 200 feet long are commonly used for heating the skelp in continuous pipe mills.

Ever since continuous pipe mills have been in use up to the making of the present invention the threading of the elongated heating furnaces used for bringing the skelp up to or close to welding temperature has presented a vexing problem. Threading is the introduction of skelp through the furnace at the beginning of its operation. Whenever the continuous operation is interrupted and skelp is removed from the furnace the furnace has to be rethreaded. The skelp is ordinarily supplied in coils which may vary in length from in the neighborhood of 100 feet to in the neighborhood of 900 feet. When the mill is in continuous operation skelp is always moving through the furnace and the rear end of a skelp being fed into the furnace has welded to it the front end of another skelp, this welding being effected by a small stationary welder known as a coil welder.

Prior to the present invention elongated heating furnaces of continuous pipe mills have always so far as we are aware been threaded in the manner now to be described. By way of example a furnace 160 feet long will be considered. The problem incident to threading is to feed the skelp into the entrance end of the furnace and advance the skelp through the furnace so that the front end of the skelp may be passed through the welder which is located in alignment with the furnace at the exit end of the furnace. As the skelp is flexible longitudinally or axially it has heretofore been considered necessary to provide what is termed a needle whose length is approximately equal to the length of the furnace, the needle being ordinarily a piece of pipe which is sufficiently stiff that it can be pushed through the furnace from one end and by virtue of such pushing emerge from the opposite end. The standard practice prior to the present invention has been to introduce this needle into the furnace at the entrance end thereof and when the rear end of the needle is almost at the point where it will enter the furnace to weld the front end of the skelp thereto. As the length of the needle approximates the length of the furnace the front end of the needle can then be pulled out of the exit end of the furnace and this pulling may be continued until the front end of the skelp emerges from the exit end of the furnace.

The problems incident to the handling of the long needle are tremendous. Great difficulty is encountered in introducing the needle into the furnace because of its great length and its consequent unwieldiness and weight. It is not uncommon to have to use simultaneously two overhead cranes and fifteen or twenty men to introduce the needle into the furnace and push it through. Lack of space is also a great handicap both in introducing the needle and in withdrawing it from the furnace and it is customary when the needle is withdrawn to cut it up into lengths so that the life of a needle is but a single threading operation. Not only is the needle itself costly but the labor cost of threading is very high due to the large number of men needed to handle the needle. Altogether this threading method, which has been the standard method of threading the elongated heating furnaces of continuous pipe mills ever since such mills first went into use, has been highly unsatisfactory and has been so recognized but no solution to the problem has heretofore been presented.

We provide for doing away entirely with the long needle heretofore deemed necessary in threading the elongated heating furnace of a continuous pipe mill. We introduce the skelp into the furnace in a very simple manner obviating the necessity of using overhead cranes or large numbers of men. We stiffen the skelp itself sufficiently so that it can be pushed through the furnace and we push the thus stiffened skelp through the furnace from the entrance end thereof. No needle at all need be used, but if desired a very short needle say three or four feet long may be used to facilitate threading the welder. We find it convenient to effect the pushing and stiffening simultaneously and by the same means. In successful commercial operation cooperating driven rolls are employed which grip and feed the skelp and at the same time impart to it sufficient longitudinal stiffness so that it can be pushed by the rolls until the front end of the skelp has passed through the furnace. After the skelp has been threaded and the mill is ready for continuous operation the means for pushing the skelp into the furnace and for stiffening it may be and preferably is rendered inoperative. This may be done simply by separating the rolls and allowing the skelp to pass freely therebetween. When the mill is in continuous operation the skelp is of course pulled or drawn through the furnace by feed rolls adjacent to or forming part of the welder.

We have found it most satisfactory to stiffen the skelp longitudinally by bending or bowing it transversely. This can be done very simply by employing as the driven rolls one roll with a convex face and another roll with a concave face, the roll faces being substantially or approximately complementary so that they bow the skelp sufficiently to make it longitudinally stiff. Skelp can also be made longitudinally stiff by making it absolutely flat or planar just as it enters the furnace as by use of a carefully adjusted roller leveller positioned immediately in front of the furnace, but we find that for threading long furnaces it is preferable to transversely bend or bow the skelp because by so doing sufficient stiffness in the skelp to enable pushing it a long distance until it passes completely through the furnace is obtained. For relatively short furnaces the skelp may be satisfactorily stiffened by flattening or levelling.

Other details, objects and advantages of the invention will become apparent as the following description of a present preferred embodiment of the invention and a present preferred method of practicing the same proceeds.

In the accompanying drawings we have shown a present preferred embodiment of the invention and have illustrated a present preferred method of practicing the same, in which Figure 1 is a diagrammatic plan view of a continuous pipe mill;

Figure 2 is a diagrammatic elevational view of the mill shown in Figure 1;

Figure 3 is a plan view of the skelp threader;

Figure 4 is an elevational view of the skelp threader shown in Figure 3 looking in the direction of the length of the skelp as it is fed thereby;

Figure 5 is a vertical cross-sectional view taken on the line V—V of Figure 4;

Figure 6 is a transverse cross-sectional view through a flat skelp;

Figure 7 is a transverse cross-sectional view through a bowed skelp; and

Figure 8 is a diagrammatic elevational view of a roller leveller.

Referring now more particularly to the drawings, there is shown in Figures 1 and 2 a continuous pipe mill which may be conventional except for a skelp threader and the doing away with the long needle heretofore considered necessary in threading. There are provided the usual jib crane 2 and skelp uncoiler 3. The skelp as it is uncoiled passes through a roller leveller 4 which removes the longitudinal curvature due to coiling. There is provided a coil welder 5 in which the trailing end of one skelp is welded to the leading end of a following skelp. This operation is repeated indefinitely as long as the mill remains in continuous operation so that the skelp as fed to the mill is of indefinite length.

From the coil welder 5 the skelp passes between pinch rolls 6 which feed it forward and down an inclined guideway 7. As it passes through the pinch rolls 6 and down the guideway 7 the skelp is lying generally flat on its face. The path of the skelp is denoted by a chain line 8 in each of Figures 1 and 2. The skelp passes down the guideway 7 to the mill floor and is arranged on the floor in a large loop 9 as shown in Figure 1. The skelp adjacent the right-hand extremity of the loop 9 viewing Figure 1 stands on edge. The skelp is drawn from from the loop 9 by vertical pinch rolls 10 which feed the skelp generally toward the left viewing Figure 1. The thus fed skelp passes beneath the guideway 7 and makes another loop 11 and from the loop 11 passes toward the right through the elongated heating furnace 12, wherein it is supported on the bottom of the furnace, and through the welder 13. A traveling saw 14 is provided for cutting the formed pipe into lengths without interrupting the continuous operation of the welder and the pipe lengths are conveyed away by suitable conveying apparatus designated generally by reference numeral 15. All portions of the mill just described may, as above stated, be conventional.

For threading the skelp through the elongated heating furnace 12 a threader shown in Figures 3, 4 and 5 and indicated diagrammatically at 16 in Figures 1 and 2 is provided. The threader comprises a pair of driven pressure rolls 17 and 18. These rolls are shown in edge view in Figure 4. The upper roll 17 has a concave face and the lower roll 18 has a convex face, the roll faces being substantially or approximately complementary. The roll 17 is fixed to a shaft 19 and the roll 18 is fixed to a shaft 20. The shafts 19 and 20 are driven through flexible or universal couplings 21 by driving shafts 22 driven by means which we shall now describe. A motor 23 supplies the power, the motor shaft 24 having fixed thereto a driving sprocket 25. A sprocket chain 26 meshes with the sprocket 25 and with a sprocket 27 loose on the upper driving shaft 22. A sprocket 28 is provided which is also loose on the upper driving shaft 22 but which is fixed to the sprocket 27 so that the sprockets 27 and 28 rotate together but do not drive the upper driving shaft 22. A sprocket 29 is fixed to the lower driving shaft 22 and is connected to the sprocket 28 by a sprocket chain 30. Within the motor pedestal casing 31 are spur gears on the respective upper and lower driving shafts 22 by which the upper shaft is driven from the lower shaft so that, viewing Figure 5, the shaft 19 and the roll 17 carried thereby rotate in the counter-clockwise direction and the shaft 20 and the roll 18 carried thereby rotate in the clockwise direction. Thus the rolls 17 and 18 cooperate to advance toward the furnace anything which passes therebetween. Screws 32 operable by hand wheels 33 are provided for adjusting or moving the rolls 17 and 18 toward and away from each other.

When the mill is to be threaded the skelp coming from the loop 11 is passed between the rolls 17 and 18 which are brought into gripping engagement with the skelp and which feed the skelp into the furnace or toward the right viewing Figures 1 and 2. The threader 16 performs simultaneously two functions, the first being to render the skelp longitudinally stiff by bending or bowing it transversely so that it conforms generally to the faces of the rolls 17 and 18 and the second being to feed or thread it into and through the elongated heating furnace 12. By reason of the action of the rolls 17 and 18 on the skelp it is sufficiently bowed or bent in the transverse direction as to stiffen it sufficiently in the longitudinal direction so that it can be pushed forward until the front end of the skelp reaches the exit end of the furnace without buckling or looping up. In Figure 7 there is shown in cross section a thus bowed or bent skelp which is designated by the letter B. In Figure 6 there is shown a flat skelp designated by the letter F. As mentioned above, we find it preferable to bow the skelp, as shown at B, particularly for relatively long furnaces. For relatively short furnaces the threader 16 may take the form of an accurately adjusted roller leveller, such as 16' as shown in Figure 8, or other device for making the skelp perfectly flat as it enters the furnace, thereby giving the skelp sufficient longitudinal stiffness that it can be pushed for an appreciable distance without buckling or looping up.

When the leading end of the skelp as it is threaded through the furnace reaches the welder, 13 it may be threaded through the welder by any suitable means as well known in the art. As mentioned above, a short needle may be employed or not as desired. When the skelp has been threaded through the furnace and the welder the mill is put into continuous operation and the skelp is drawn or pulled through the furnace either by the welder itself or by feed rolls employed in conjunction therewith. When the mill is ready to go into continuous operation the rolls 17 and 18 are separated so that they no longer have any effect upon the skelp. The motor 23 is preferably stopped and the skelp is pulled through the furnace and may simply drag over the roll 18 or may be otherwise guided as it enters the furnace.

In certain cases it may be sufficient to drive only one of the rolls 17 and 18 and reference to driven pressure rolls or similar references in the claims comprehend threaders in which both rolls are driven as above described or in which only one roll is driven.

While we have shown and described a present preferred embodiment of the invention and a present preferred method of practicing the same it is to be distinctly understood that the invention is not limited thereto but may be otherwise variously embodied and practiced within the scope of the following claims.

We claim:

1. A method of threading skelp or the like into a furnace of such length that unstiffened skelp whose length is at least as great as the length of the furnace would loop up if attempted to be advanced through the furnace solely by pushing it from the end of the furnace at which it enters comprising introducing into an end of the furnace skelp whose length is at least as great as the length of the furnace, advancing the skelp through the furnace solely by pushing it from the end of the furnace at which it enters and imparting to the skelp sufficient longitudinal stiffness so that it can be thus advanced without looping up until the front end of the skelp has passed through the furnace but while the skelp is still in generally flat as distinguished from generally tubular form.

2. A method of threading hkelp or the like into a furnace of such length that unstiffened skelp whose length is at least as great as the length of the furnace would loop up if attempted to be advanced through the furnace solely by pushing it from the end of the furnace at which it enters comprising introducing into an end of the furnace skelp whose length is at least as great as the length of the furnace, advancing the skelp through the furnace solely by pushing it from the end of the furnace at which it enters and bending the skelp transversely to impart and thereby imparting to it sufficient longitudinal stiffness so that it can be thus advanced without looping up until the front end of the skelp has passed through the furnace but while the skelp is still in generally flat as distinguished from generally tubular form.

3. A method of threading skelp or the like into a furnace of such length that unstiffened skelp whose length is at least as great as the length of the furnace would loop up if attempted to be advanced through the furnace solely by pushing it from the end of the furnace at which it enters comprising introducing into an end of the furnace skelp whose length is at least as great as the length of the furnace, advancing the skelp through the furnace solely by pushing it from the end of the furnace at which it enters and leveling the skelp to impart and thereby imparting to it sufficient longitudinal stiffness so that it can be thus advanced without looping up until the front end of the skelp has passed through the furnace.

4. A method of threading skelp or the like into a furnace of such length that unstiffened skelp whose length is at least as great as the length of the furnace would loop up if attempted to be advanced through the furnace solely by pushing it from the end of the furnace at which it enters comprising introducing into an end of the furnace skelp whose length is at least as great as the length of the furnace and advancing the skelp through the furnace solely by feeding it forward therethrough between driven rolls positioned adjacent the end of the furnace at which the skelp enters and which act on the skelp to impart to it sufficient longitudinal stiffness so that it can be thus advanced without looping up until the front end of the skelp has passed through the furnace but while the skelp is still in generally flat as distinguished from generally tubular form.

5. A method of threading skelp or the like into a furnace of such length that unstiffened skelp whose length is at least as great as the length of the furnace would loop up if attempted to be advanced through the furnace solely by pushing it from the end of the furnace at which it enters comprising introducing into an end of the furnace skelp whose length is at least as great as the length of the furnace and advancing the skelp through the furnace solely by feeding it forward therethrough between driven rolls positioned adjacent the end of the furnace at which the skelp enters and which bend the skelp transversely to impart to it sufficient longitudinal stiffness so that it can be thus advanced without looping up until the front end of the skelp has passed through the furnace but while the skelp is still in generally flat as distinguished from generally tubular form.

6. In combination, a furnace of such length that unstiffened skelp whose length is at least as great as the length of the furnace would loop up if attempted to be advanced through the furnace solely by pushing it from the end of the furnace at which it enters and means positioned solely adjacent the end of the furnace at which the skelp enters for imparting to the skelp sufficient longitudinal stiffness so that it can be advanced through the furnace solely by pushing it from such end of the furnace until the front end of the skelp has passed through the furnace without looping up and thus advancing the skelp through the furnace, said means being so constructed and arranged that the skelp after being operated upon thereby is still in generally flat as distinguished from generally tubular form.

7. In combination, a furnace of such length that unstiffened skelp whose length is at least as great as the length of the furnace would loop up if attempted to be advanced through the furnace solely by pushing it from the end of the furnace at which it enters and rolls positioned solely adjacent the end of the furnace at which the skelp enters for advancing the skelp through the furnace, said rolls being so constructed and arranged as to impart to the skelp sufficient longitudinal stiffness so that it can be advanced through the furnace solely by the action of such rolls until the front end of the skelp has passed through the furnace without looping up, said rolls being of such shape that the skelp after being operated upon thereby is still in generally flat as distinguished from generally tubular form.

8. In combination, a furnace of such length that unstiffened skelp whose length is at least as great as the length of the furnace would loop up if attempted to be advanced through the furnace solely by pushing it from the end of the furnace at which it enters and rolls positioned solely adjacent the end of the furnace at which the skelp enters for advancing the skelp through the furnace, said rolls having cooperating curved surfaces which bend the skelp transversely and thereby impart to it sufficient longitudinal stiffness so that it can be advanced through the furnace solely by pushing it from such end of the furnace until the front end of the skelp has passed through the furnace without looping up, said rolls being of such shape that the skelp after being operated upon thereby is still in generally flat as distinguished from generally tubular form.

AUGUST J. WAGNER.
CLARENCE H. VERWOHLT.